United States Patent [19]

Wilson

[11] Patent Number: 4,469,490
[45] Date of Patent: Sep. 4, 1984

[54] METHOD AND APPARATUS FOR CLEANING AIR ENTERING THE CAB OF A VEHICLE

[75] Inventor: Thomas W. Wilson, Kimball, Nebr.

[73] Assignee: Accessory Sales, Inc., Kimball, Nebr.

[21] Appl. No.: 436,984

[22] Filed: Oct. 22, 1982

[51] Int. Cl.³ ...................... B01D 45/12; B01D 45/18
[52] U.S. Cl. ......................................... 55/1; 55/385 B;
  55/431; 98/2.11; 98/2.14; 180/68.2
[58] Field of Search ................... 55/96, 385 B, 431, 1;
  98/2.11, 2.14, 2.18; 180/54 A, 54 D, 89.12, 900,
  68.2

[56] References Cited

U.S. PATENT DOCUMENTS

| | | | |
|---|---|---|---|
| Re. 30,409 | 9/1980 | Borsheim | 55/429 |
| 1,591,677 | 7/1926 | Garner | 55/431 |
| 2,674,175 | 4/1954 | Backe | 98/2.18 |
| 2,681,608 | 6/1954 | Wunderlich | 98/2.18 |
| 3,202,076 | 8/1965 | Fieni | 98/2.18 |
| 3,436,900 | 4/1969 | Evens et al. | 55/385 B |
| 3,696,591 | 10/1972 | Bennett et al. | 55/337 |
| 3,838,675 | 10/1974 | Schaeffer | 55/430 |
| 3,864,109 | 2/1975 | Hansen | 55/324 |
| 3,877,454 | 4/1975 | Axmann et al. | 55/337 |
| 4,120,675 | 10/1978 | Boyles et al. | 55/385 B |
| 4,204,848 | 5/1980 | Schulmeister et al. | 55/269 |
| 4,248,613 | 2/1981 | Linhart | 55/394 |
| 4,323,369 | 4/1982 | Monson et al. | 55/385 B |

FOREIGN PATENT DOCUMENTS 850414  8/1981  U.S.S.R. .................. 98/2.11

Primary Examiner—David Lacey
Attorney, Agent, or Firm—Berman, Aisenberg & Platt

[57] ABSTRACT

Method and apparatus for filtering air admitted to the cab of a vehicle, particularly one which operates in a severe environment, comprises a pre-cleaner unit and a source of low pressure which continuously removes separated particles from the pre-cleaner unit. The source of low pressure is a venturi which is operated by the flow of air passing through the radiator of the vehicle's engine.

4 Claims, 4 Drawing Figures

METHOD AND APPARATUS FOR CLEANING AIR ENTERING THE CAB OF A VEHICLE

This invention relates to the art of air filtration, and, in particular, to the art of filtration of air which is admitted to the cab of a vehicle which is operated in a severe environment.

BACKGROUND ART

Pre-cleaner units for cleaning air flowing into an internal combustion engine are known. These units remove coarse particles from the air flow by causing rotation of the air flow so that centrifugal force separates the coarse particles from the air flow. These particles are then collected in the pre-cleaner unit housing. U.S. Pat. Nos. 4,248,613 and 3,864,109 show air cleaners which are typical of this type.

Air filters for internal combustion engines having a means for removing accumulated debris which has been removed from air are known in the art. The filters shown in U.S. Pat. Nos. 3,877,454; 4,204,848; 3,696,591; 3,838,675; and Re. 30,409 have motor-driven vacuum pumps which remove accumulated debris from the filters. Each of these devices requires a separate power means for driving the vacuum pump.

Another type of apparatus which evacuates a cleaner unit is described in the Prior Art section of U.S. Pat. No. 4,248,613. There is described a unit wherein a venturi tube is attached to the exhaust pipe of an engine. The suction created by the venturi tube evacuates particles from a pre-cleaner unit which is connected to an internal combustion engine.

It is also known to employ an air filter in connection with an air conditioner which cools air admitted to the cab of a vehicle, particularly a farm tractor. Since air admitted to the cab contains a high concentration of dust, the filter frequently becomes clogged.

STATEMENT OF THE INVENTION

The prior art devices which employ a vacuum pump to draw off debris from a pre-cleaner suffer from the disadvantages that the pump and the motor which drives the pump must be maintained and frequently break down. Since the pump and motor are additional items, there is an expense to purchase, install, and maintain these items. Furthermore, the pump reduces the power available to drive the tractor since energy is required to drive the motor. Those pumps which are directly driven by the tractor engine clearly reduce the power available to drive the tractor.

Pre-cleaner unit evacuators which employ a venturi tube located in flowing exhaust gasses suffer from the disadvantage that they are not usable to clean air admitted to the cab of a vehicle because the exhaust gasses may migrate through the connecting tube into the pre-cleaner unit, and be drawn into the cab. Such may occur, for example, when the venturi is defective, or when the exhaust cap is accidentally closed, thus forcing the exhaust gas into the tube. Such a condition is dangerous and should be avoided since the noxious gasses will be inhaled by the human occupant of the cab.

The cleaner evacuator of the present invention employs a venturi for evacuating a cleaner unit, preferably a pre-cleaner unit, which is attached to the cab of a tractor. The venturi is located in the flow of air passing through the radiator of the vehicle's engine. The evacuated dirt is thus pulled into the venturi and then blown out of the venturi by the flow of air passing around the engine. This technique insures that only ambient air passes through the venturi. If the venturi is defective or becomes clogged, only air containing no more contaminates than that which is drawn into the pre-cleaner unit anyway passes back through the evacuator tube and into the pre-cleaner unit.

It is an object of this invention to provide a method of evacuating a cleaner unit which includes placing a venturi in the flow of air caused by the fan of an engine.

It is an object of this invention to provide a venturi which is adapted to produce suction adequate to evacuate a pre-cleaner unit upon passage through the venturi of air from the fan of a vehicle's engine.

DETAILED DESCRIPTION OF THE INVENTION

Figure 1:
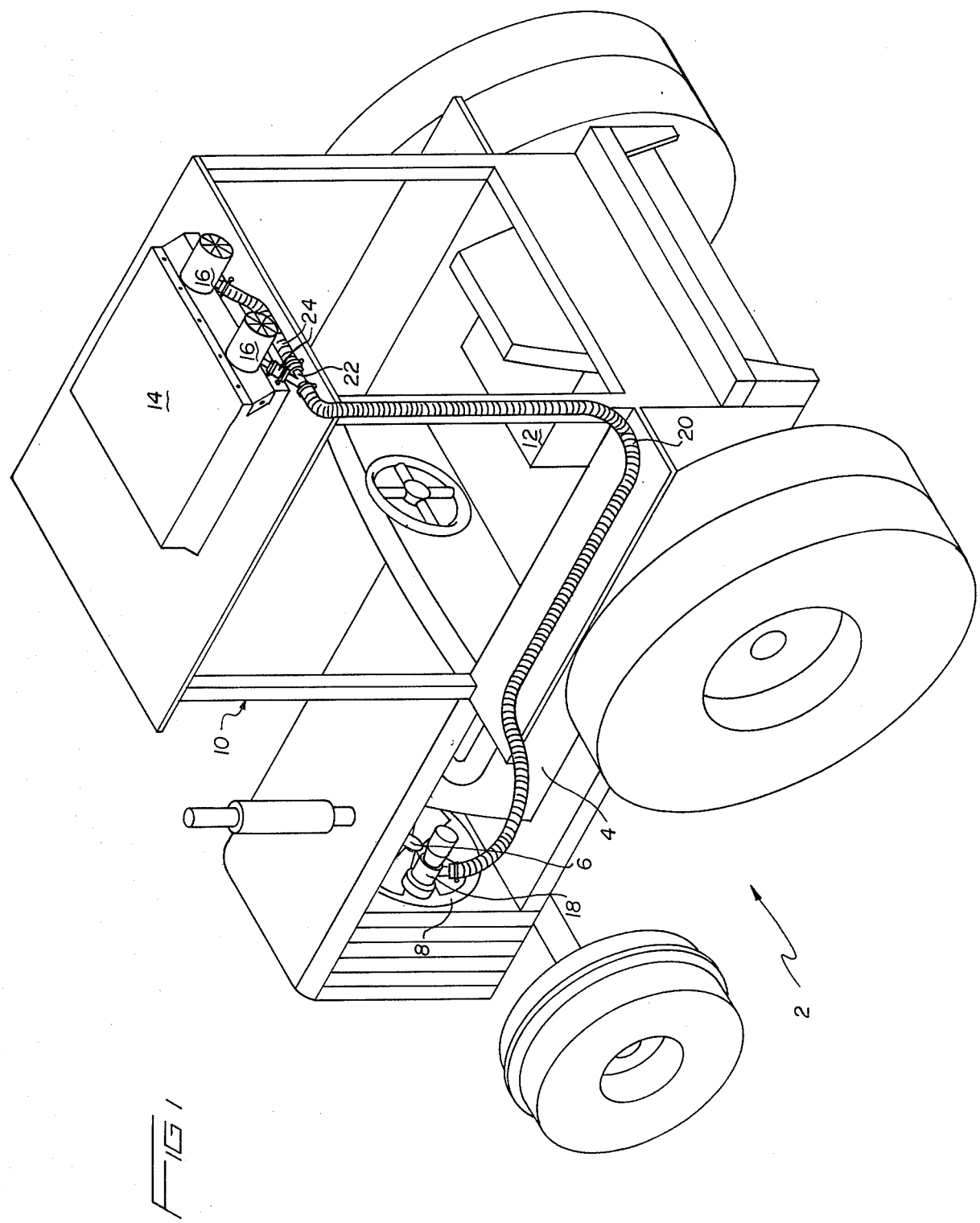
FIG. 1 is a perspective view of a farm tractor showing the invention installed.

FIG. 1 shows a farm tractor 2 having the invention installed. The tractor includes an internal combustion engine 4 which has a fan 6 for drawing air through a radiator 8. The fan is driven in a known manner, such as by a belt connected to the driveshaft of the engine. Alternatively, an electric motor may drive the fan.

The cab 10 of the vehicle is enclosed and provides a seat 12 for an operator. Air conditioning unit 14 is located on top of the cab. This unit cools air in the cab and supplies fresh air to the cab.

The cooling and filtering of the air by the unit 14 is very important since the cab is enclosed. In the absence of cooling, the temperature inside the cab may become quite high and cause physical harm to the operator. Some vehicles, such as the farm tractor shown in FIG. 1, operate under quite adverse environmental circumstances in that the ambient air is typically dust-laden. If this dust-laden air is admitted to the cab, the operator will experience discomfort and may develop a serious illness.

The air conditioning unit 14 includes a number of filter elements to clean the air admitted to the cab. Some of these may be of the type which employs folded paper. Since the environmental conditions are quite severe, it has been found advantageous to use pre-cleaner units, such as those shown at 16 to remove coarse dirt prior to directing the flow of air to the other filters. While two pre-cleaner units are shown, it is clear that any number may be used.

The pre-cleaner units provide for a much longer life of the other cleaner in the air conditioning unit 14 by removing large amounts of coarse dirt which would rapidly clog the other filters. In order to keep the pre-cleaner units operating properly, it is necessary to remove the accumulated dirt which has been removed from the air. This dirt is removed by providing a port in the side of the pre-cleaner unit which will be described with respect to FIG. 2. A low-pressure source may evacuate the coarse dirt through this port.

The low-pressure source is obtained by a venturi 18 which has a low-pressure port attached to the outlet port of the pre-cleaner unit by a hose 20. The venturi 18 is located with respect to the radiator 8 and fan 6 so as to be in the flow of air caused by the fan 6. As the air flows through the venturi 18, a low pressure is developed in hose 20 which draws the coarse dirt out of the pre-cleaner unit 16. As shown in FIG. 1, hose 20 contains a T-section 22 to allow connection of two pre-cleaner units to the hose 20 by second hose sections 24.

As debris or coarse dirt is drawn from the pre-cleaner unit 16, through the hose 20, and into the venturi 18, it is blown out of the rear portion of the venturi 18 along with the flow of air. This debris is then simply re-introduced to the ambient air and is thus effectively eliminated.

The proper location of the venturi 18 in the air flow of the fan 6 is best experimentally determined separately for each tractor. It is clear that the flow should be of high velocity and not turbulent at the chosen location. The location of such a flow will depend upon the particular characteristics of the tractor and the additional equipment installed on the tractor engine. While the venturi 18 is shown behind the fan 6, it may be in front of the fan if the air flow is adequate.

Figure 2:
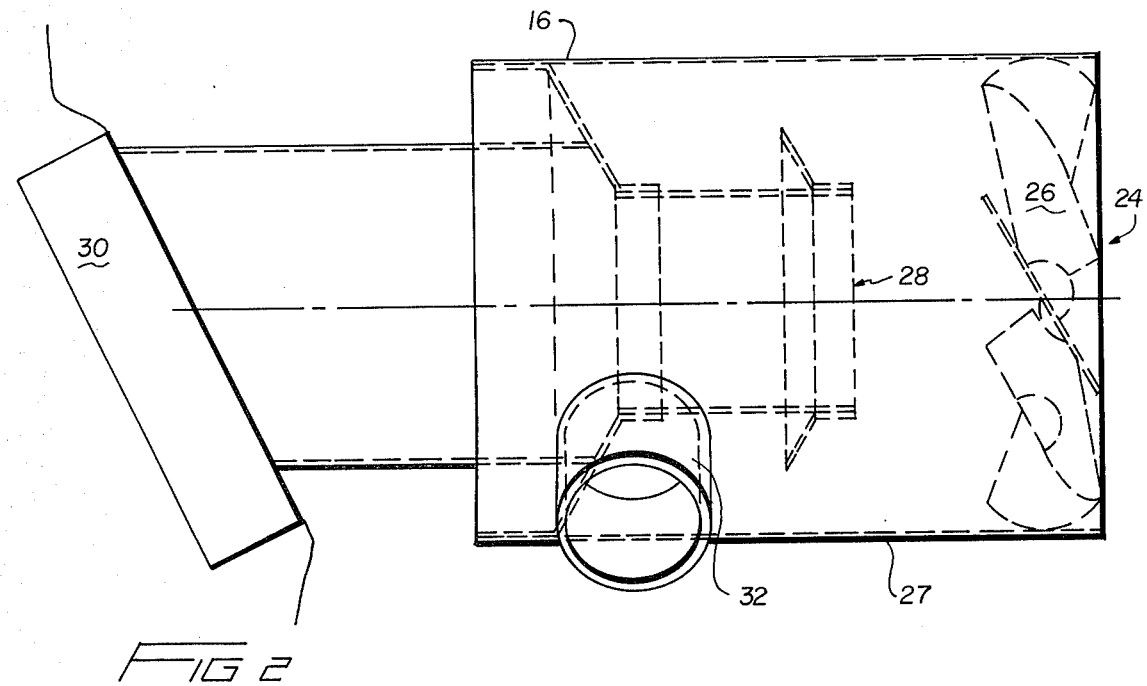
FIG. 2 is an elevation view of a precleaner unit in accordance with the invention.

FIG. 2 shows a pre-cleaner unit 16 where interior parts are shown in broken lines. Air is admitted through inlet port 24. The inlet port includes vanes 26 which impart a circular flow to the incoming air. Heavy objects and coarse particles of dirt are thrown to the outer cylindrical portion 27 of the pre-cleaner unit by centrifugal force, and the cleaned air passes through opening 28 to be directed into the inlet 30 of the air conditioning unit 14. Outlet 32 of the pre-cleaner unit 16 communicates with the outer cylindrical portion of the pre-cleaner unit so that dirt may be evacuated. Outlet 32 is connected to hose 20 so that the low pressure created by the venturi 18 may be applied to the pre-cleaner unit.

Figure 3A:
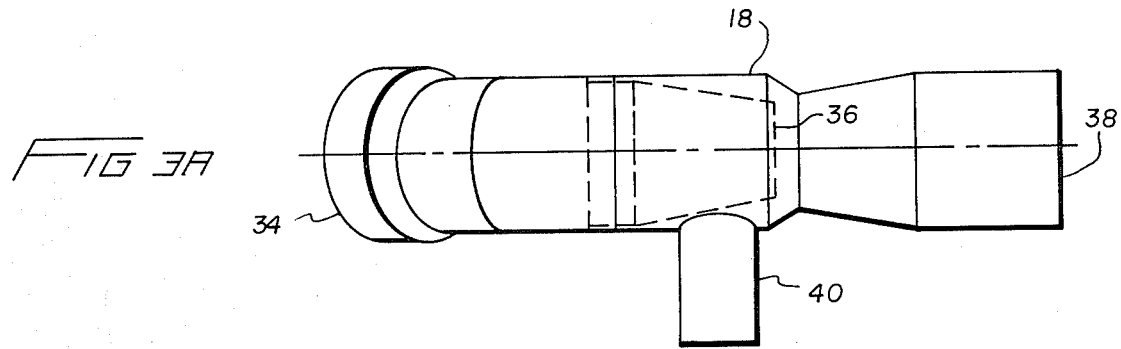
FIG. 3A is a plan view of a venturi in accordance with the invention.

FIG. 3A shows a plan view of a venturi 18 in accordance with the invention. The venturi 18 includes an air inlet 34 which may be angled with respect to the remainder of the venturi to allow flexibility in placing the venturi in a flow of air. A throat section 36, shown in phantom lines, causes increased velocity of the air and produces a low pressure at port 40. Air entering inlet 34 exits through outlet 38. Debris which is evacuated from the pre-cleaner unit 16 is pulled into the venturi by the action of the flowing air, and then joins air in the venturi to flow through the outlet port 38.

Figure 3B:
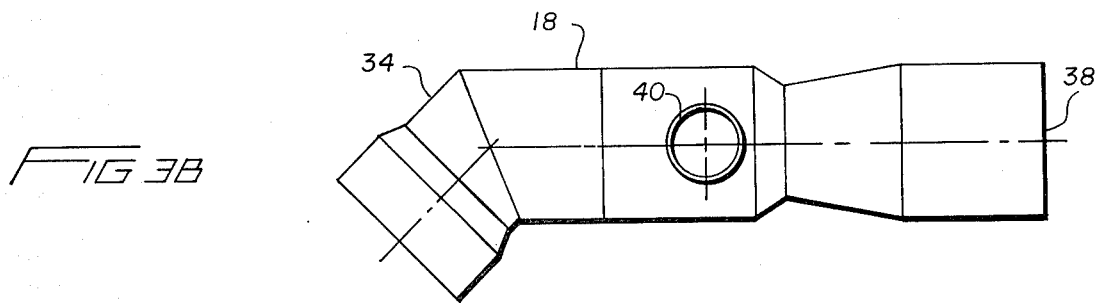
FIG. 3B is an elevation view of a venturi in accordance with the invention.

FIG. 3B is a side view of the venturi 18 showing the angular relationship between the inlet 34 and the main body of the venturi 18.

It is claimed:

1. In a vehicle having an internal combustion engine with a radiator, a fan for causing air flow through said radiator, and a cab for housing an operator, the improvement comprising pre-cleaner means for removing dirt from air entering an air-inlet means of said cab, and venturi means positioned and arranged with respect to said fan so that said air flow is in flow communication with said pre-cleaner means so as to draw dirt separated by said pre-cleaner means away from said pre-cleaner means.

2. The vehicle of claim 1 wherein said pre-cleaner means comprises a cyclone means for separating coarse objects.

3. A method for separating particulate matter from air entering a cab of an engine driven vehicle comprising placing a pre-cleaner unit, which separates particulate matter from an air flow and accumulates particulate matter at a first location, on said cab such that the flow of air passes through said pre-cleaner unit and then enters said cab, placing a venturi unit, which produces low-pressure at a port thereof, behind an air fan driven by said engine so that air from said fan passes through said venturi, and connecting said low pressure port to said first location whereby said particulate matter which is removed from said air by said pre-cleaner unit is drawn from said pre-cleaner unit and exhausted through said venturi.

4. The method of claim 3 wherein said fan also causes a flow of air through a radiator operatively connected to said engine and wherein said engine is an internal-combustion engine.

* * * * *